United States Patent [19]

Kuhlmann et al.

[11] 4,402,220
[45] Sep. 6, 1983

[54] WIND DIRECTION INDICATOR

[75] Inventors: Werner Kuhlmann, Stephanskirchen; Werner Redlinger, Öhningen, both of Fed. Rep. of Germany

[73] Assignee: Pfeiffer Gerätebau GmbH, Radolfzell, Fed. Rep. of Germany

[21] Appl. No.: 221,303

[22] Filed: Dec. 30, 1980

[30] Foreign Application Priority Data

Jan. 11, 1980 [DE] Fed. Rep. of Germany ....... 3000894
Oct. 14, 1980 [DE] Fed. Rep. of Germany ... 8027377[U]

[51] Int. Cl.³ ............................................. G01W 1/00
[52] U.S. Cl. ..................... 73/188; 114/102; 116/26; 116/DIG. 7
[58] Field of Search ...... 73/188, 189, 178 R, 73/180; 33/343; 114/102, 103; 116/265, 28 R, 116/26, 200, DIG. 7

[56] References Cited

U.S. PATENT DOCUMENTS

| 3,224,269 | 12/1965 | Weir | 73/189 |
| 3,800,728 | 4/1974 | Dowling | 114/102 |
| 3,802,373 | 4/1974 | Lagerquist | 114/102 |
| 4,283,943 | 8/1981 | Schoneberger | 73/188 |
| 4,314,477 | 2/1982 | Yancy | 73/188 |

Primary Examiner—E. R. Kazenske
Assistant Examiner—Denis E. Corr
Attorney, Agent, or Firm—Steele, Gould & Fried

[57] ABSTRACT pg,1 A wind direction indicator for sailing vessels, particularly wind surfers or small yawls uses a weather vane pivoted to one end of an outrigger. The outrigger is to be fitted to the mid-height of the mast in the angle of vision of the yachtsman using a clamping device. In the case of a rotatable mast or a sail surrounding the mast, the outrigger can rotate in such a manner as a function of the sail position that the wind direction indicator is always on the windward side of the sail. Bearing aids for maintaining the best cruising course and a compass mounting support can be provided on the outrigger.

13 Claims, 4 Drawing Figures

WIND DIRECTION INDICATOR

BACKGROUND OF THE INVENTION

The invention relates to a wind direction indicator for sailing vessels with a pivotably mounted weather vane. In the case of yachts, weather vanes are normally fixed to the mast head in order to be able to indicate the wind direction while being influenced to the minimum by the air current deflection due to the rigging. However, they have the disadvantage that they can only be read with difficulty by the helmsman, because he must look directly upwards. However, in the case of wind surfers and fast yawls, all attention must be directed at the sail, the boat and its handling.

It is admittedly known to fit wind direction indicators in the form of strips or the like to the shrouds, but the air current is often disturbed there. In addition, fitting cannot take place when masts are unpoled. For this reason and due to the risk of damage no usable wind direction indicator has as yet been developed for wind surfers.

BRIEF SUMMARY OF THE INVENTION

The object of the invention is to provide a wind direction indicator which, despite an easy fitting in such a way that it can be satisfactorily read, permits a usable wind direction indication and is in particular suitable for wind surfers.

According to the invention, this object is achieved in that the weather vane is arranged at the end of an outrigger projecting from the central area of the yacht mast.

Thus, this wind direction indicator is continuously in the natural line of vision of the helmsman or surfer. In spite of this, the air currents are not disturbed, particularly in the case of cathead rigging in which there is only a sail behind the mast (no foresail). Due to the attachment to the central area of the mast, the wind direction indicator is in an area between the mast foot and the mast head normally taken up by the sail.

Preferably, the outrigger is arranged on the sail and/or mast in rotatable manner on the side of the mast opposite to the sail. Thus, whether the mast is rotatable with the sail, or whether the sail can be mounted so as to be rotatable around the mast as is usually the case with wind surfers, the outrigger rotates in such a way that for most courses or headings it is directly in front of the wind leading edge of the sail. Preferably, the outrigger has a spring clip means with which it engages over a portion of the sail surrounding the mast.

According to another embodiment, the outrigger can have a device for insertion in a bag fitted to the sail. The outrigger can then be rotated particularly easily together with the sail and no problems are encountered when fitting it. The arrangement of the wind direction indicator in the line of vision of the yachtsman makes it possible to provide on the outrigger a mounting support for a compass. Wind surfers and small yawls admittedly normally stay close to the coast, but in misty weather it is possible to easily lose sight of the land, even at a short distance from the coast. In the presence of currents and turning winds, even the experienced yachtsman can easily lose his bearings. Fitting to the outrigger is ideal because easy reading is possible. Normally on a surf board or small yawl, there is virtually no possibility for fitting a compass and the yachtsman normally has no possibility to store or use a hand compass.

Further advantages and features of the invention can be gathered from the subclaims.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figures 1, 2:
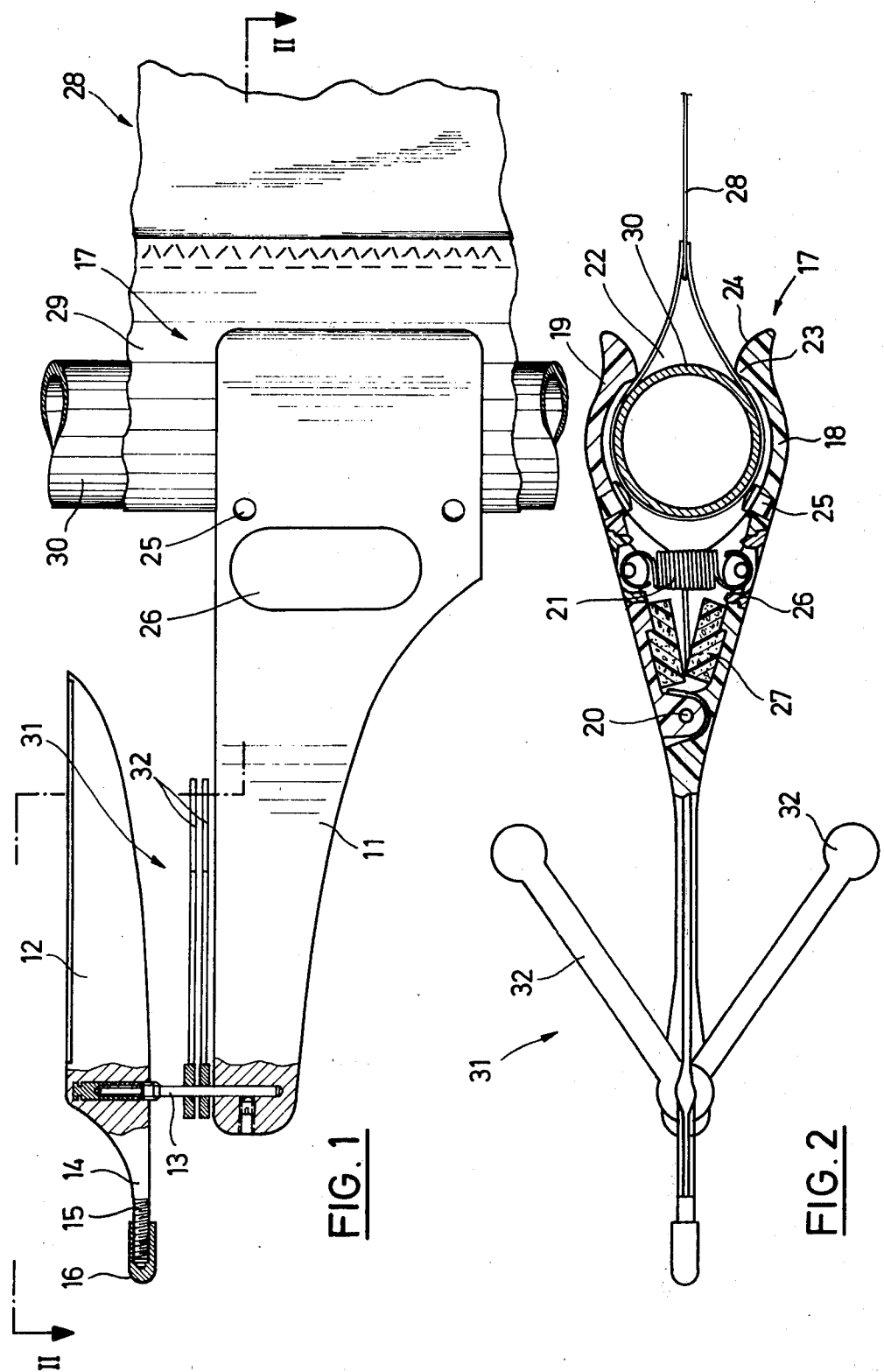
FIG. 1 is a side view of the first embodiment of the invention.
FIG. 2 is a part sectional plan view along the line II—II of FIG. 1.

The first embodiment of a wind direction indicator shown in FIGS. 1 and 2 essentially comprises a plastic outrigger 11 and a plastic weather vane 12, whose non-rotary securing pin 13 can be fixed in a vertical bore at the free end of the outrigger by a grub screw. The upper end of pin 13 engages in a pivot bearing fixed to the weather vane made in one piece from plastic. The projecting end 14 of the weather vane pointing counter to the wind direction is in the form of a plastic bolt with a thread 15 onto which can be screwed a metal counterweight in the form of a cap nut 16.

The outrigger 11 widens from its relatively narrow free end to its attachment device 17, which in the present case is a spring clip. Thus, the outrigger has two jaws 18, 19, which together give a tulip-shaped construction enabling a mast between them. Jaw 18 is connected in one piece with the remainder of the outrigger, while jaw 19 is articulated via a hinge-like articulation 20 to a hinge pin on the outrigger. The two jaws are pressed against one another by two spiral tension springs 21 arranged between the two jaws between articulation 20 and the securing mouth 22. The jaws engage around a mast by about 270°, independently of its thickness. The position shown in FIG. 2 is that of the thinnest mast which can be secured in the mouth 22, the latter being opened more widely for thicker masts. The bearing surface for the two jaws is formed by vertically directed ribs 23 at the exit of the securing mouth with which is linked a funnel-shaped entry bevel 24 permitting an easy mounting on the mast. In vertically superimposed manner on each jaw 18, 19 are provided two pressure buffers 25 and with reference to the represented mast are displaced by approximately 90° relative to ribs 23 and comprise rubber buffers inserted in bores on the jaws.

Inserts 26 are inserted into correspondingly shaped recesses on both jaws and are fixed by pressing or snapping in. These jaws are also made from plastic, but have a different colour from outrigger 11 and in addition each individual insert has a different colour. Thus, for example, the lefthand insert can be red and right-hand insert green. As a result, the yachtsman can not only obtain information on the colours generally attributed in maritime circles to the sides of a vessel, but can also immediately obtain information on when he has to give way for another vessel. Thus, he must give way to a vessel sailing on the other bow if he is sailing on the starboard bow and has in front of him the red or port insert. The reverse takes place on the other bow, so that if he does not have to give way for the vessels sailing on the other bow, he has the green insert in front of him.

Two foam inserts 27 are placed in the space formed between the two jaws in the vicinity of articulation 20 and they ensure that the wind direction indicator is buoyant and floats if dropped overboard. This can naturally also be achieved by selecting an appropriate plastics material, but as a result greater freedom is obtained with regard to the choice of material.

As can in particular be gathered from FIG. 2, the wind direction indicator is placed over the sail 28 surrounding mast 30 with a mast bag 29. Due to the entry bevel 24 and the tulip-shaped construction of the securing mouth, it is normally only necessary to force-fit the outrigger until it snaps onto the mast. Tension springs 21 ensure a powerful clamping action with a relatively constant clamping force, even in the case of different mast diameters. Due to the good hold resulting from the construction of ribs 23 with grooves or a surface roughening, together with buffer 25 made from slip-inhibiting material(rubber), the attachment device 17 has a very good retaining action on the outer surface of the sail, while the latter can slide more easily on the smooth mast 30. This ensures that even when the mast is not also rotating, the outrigger rotates with the sail and does not secure the latter in punctiform manner.

The wind direction indicator should normally be fitted somewhat above head height of the yachtsman, corresponding to approximately half the height of the mast, i.e. approximately 2 to 2.30 m above the mast foot.

At the front end of the outrigger, where the weather vane is pivoted at approximately 10 to 20 cm from the mast, an indicating device 31 can be provided having e.g. two arms 32 normally pointing away from the outrigger at an angle of approximately 45°. They serve to indicate to the surfer whether he is maintaining the optimum angle to the likely wind when cruising. As in the represented embodiment, this indicating device can have two adjustable arms 32 secured to the shaft 13. However, it can also comprise a fixed plastic plate with the two arms clamped or in some other way fixed to the end of the outrigger. The reading is taken by the surfer by making the weather vane coincide with the arms 32.

Figure 3:
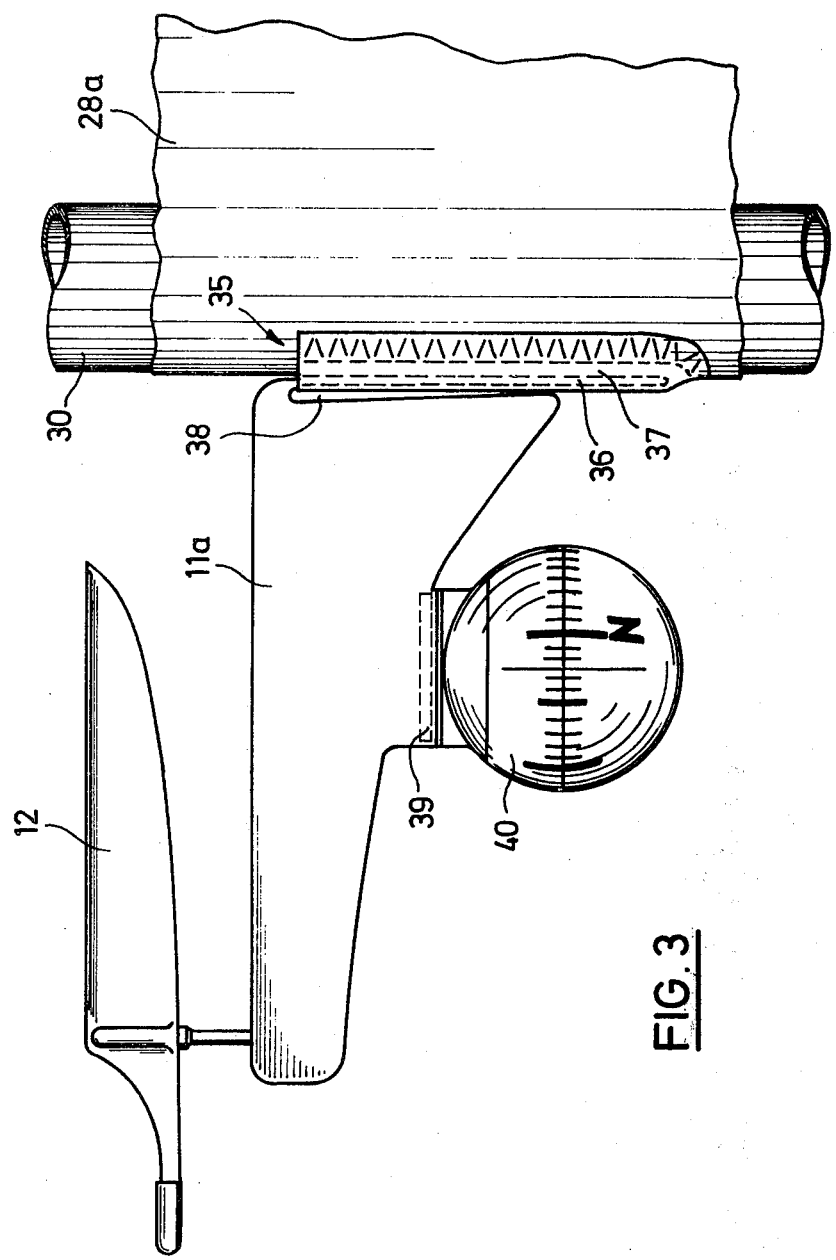
FIG. 3 is a side view of a second embodiment.

The second embodiment according to FIG. 3 coincides with the first embodiment with regard to the weather vane. However, at its end facing mast 30, the outrigger has, in place of the clamping device, a fitting device 35 comprising an elongated, vertical part 36 shaped onto the outrigger 11a and which can be inserted from above into the bag 37 sewn to the sail at the leading edge of the mast. A gap 38 is formed between part 36 and the outrigger 11a, the outrigger being additionally secured by clamping action and the inherent resilience of the material of bag 37. However, other securing means are conceivable, e.g. a thimble provided in the mast bag and in which engages a projection in the vicinity of gap 38.

A mounting support 39 for a compass 40 is provided on the bottom of the outrigger. The mounting support can be constructed in much the same way as a shoe on a camera, i.e. can have a dovetail-shaped guide in which is inserted the compass and can optionally be secured by a safety slot. Compass 40 is preferably a spherical compass suspended beneath the outrigger, making it easy to read without impeding the weather vane 12. Normally, a very simple compass is adequate, because in a spherical compass no cardan suspension is required and on a wind surfer there are normally no ferromagnetic or permanent magnetic parts which could cause a deviation. Thus, a very simple, non-compensatable compass is sufficient for obtaining an adequate reading.

Figure 4:
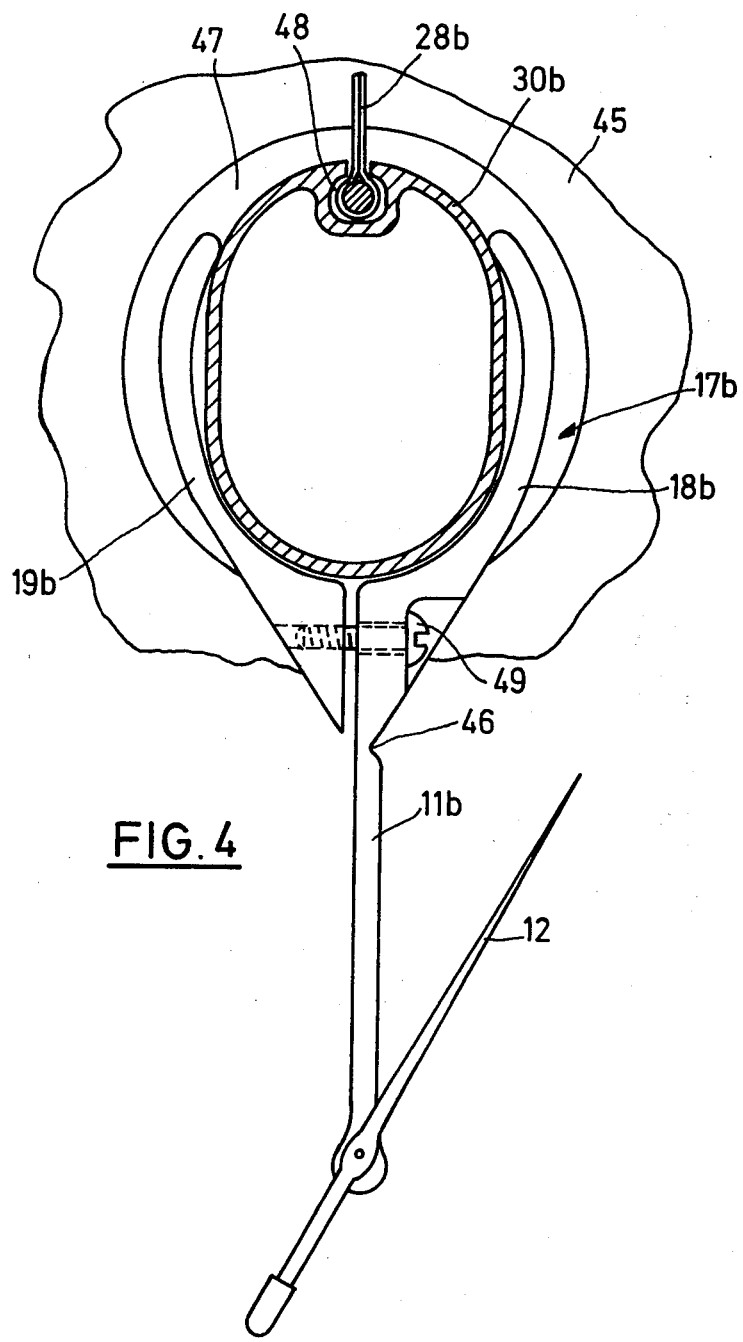
FIG. 4 is a section through a third embodiment.

FIG. 4 shows a wind direction indicator, whose outrigger 11b is fitted to a mast 30b not surrounded by sail 28b and pivotably mounted in a mast foot 47 of a sailing vessel 45, e.g. a yawl or wind surfer. In conventional manner, sail 28b is received with its reinforced front rope in a mast slot 48.

While otherwise having the same construction as in FIG. 1, outrigger 11b is provided with a fitting device 17b having two jaws 18b, 19b, whereof jaw 18b is connected in one piece with the remainder of the outrigger, while jaw 19b can be fastened to the outrigger by an attachment screw 49.

In the vicinity of the mast, outrigger 11b has a desired bending point in the form of a vertical slot. It serves to prevent injury which could occur to a surfer who had had the misfortune to fall on the mast when the outrigger was fixed to the mast. In the case of attachment by a fastening device, there is in any case no risk of injury. By a suitable choice of the plastics material, the desired bending point can be made such that it only permits a temporary bending action, without breaking taking place.

It is apparent that in this case, the outrigger is secured relative to the mast so that, when sailing, it can rotate into the most favourable position with the rotation of the mast. It also remains on the side of the mast opposite the sail.

I claim:

1. A wind direction indicator for a sailing craft, comprising:
    an outrigger;
    a weather vane rotatably mounted at one end of the outrigger; and,
    attachment means at the opposite end of the outrigger for engaging, and enabling the outrigger to be carried by, a sleeve portion of a sail used for attaching the sail to a mast by overfitting the mast, the attachment means including a pair of jaws urged together by resilient means, the outrigger being attachable at an angular orientation relative to the sail, about the mast, the angular orientation remaining fixed irrespective of all subsequent rotational orientations of the sailing craft, the mast and the sail, relative to one another, whereby the wind direction indicator can be operationally fixed to remain clear of wind currents driving the sail.

2. A wind direction indicator according to claim 1, wherein the attachment means is adapted to attach to the sail, over the mast, at a height of approximately 1.80 to 2.50 m.

3. A wind direction indicator according to claim 1, wherein the outrigger is at least 10 to 20 cm long, whereby the outrigger is sufficiently long that the weather vane is located outside an air current stagnation area due to the sail, the outrigger positioning the weather vane opposite the mast from the sail.

4. A wind direction indicator according to claim 1, wherein the outrigger has a desired bending point adjacent the attachment means.

5. A wind direction indicator according to claim 1, further comprising a mounting support on the outrigger, for mounting a compass.

6. A wind direction indicator according to claim 1, characterized in that the outrigger has differently coloured inserts on two opposite sides.

7. A wind direction indicator according to claim 1, further comprising an indicating device for preferred wind strike directions, said indicating device being in the form of optionally adjustable arms.

8. A wind direction indicator according to claim 1, further comprising a buoyant insert disposed in the outrigger.

9. A wind direction indicator accordingly to claim 1, wherein the weather vane is made from a plastics material, the weather vane having a shaft defining a wind direction, the shaft having a thread on a portion thereof counter to the wind direction for screwing down a metal counterweight.

10. A wind direction indicator according to claim 1, further comprising a buoyant insert disposed between the jaws.

11. A wind direction indicator for a sailing craft of the type having a mast and a sail mountable on the mast, the sail having an elongated sleeve for overfitting the mast, the sail being rotatable with respect to the mast, the sleeve sliding around the mast as the craft is maneuvered, the wind direction indicator comprising:
   a bag sewn to the sleeve opposite the mast from the sail;
   an outrigger;
   a weather vane rotatably mounted at one end of the outrigger; and,
   fitting means disposed at the opposite end of the outrigger, for attaching the outrigger to the bag sewn to the sleeve of the sail, the fitting means positioning the outrigger and weather vane to project from the mast, the outrigger remaining on a side of the mast opposite the sail as the craft is maneuvered, whereby the weather vane remains in view and clear of wind currents driving the sail, and operative surfaces of the sail remain free of distortion.

12. A wind direction indicator for a sailing craft, comprising:
   an outrigger;
   a weather vane rotatably mounted at one end of the outrigger; and,
   attachment means at the opposite end of the outrigger for engaging and enabling the outrigger to be carried by a sleeve portion of a sail used for attaching the sail to a mast by surrounding the mast, the attachment means having a spring clip means including two jaws connected together in articulated manner and loaded with respect to one another by springs, the jaws being provided with pressure buffers therebetween.

13. A wind direction indicator according to claim 12, further comprising a buoyant insert disposed between the jaws.

* * * * *

UNITED STATES PATENT AND TRADEMARK OFFICE
CERTIFICATE OF CORRECTION

PATENT NO. : 4,402,220

DATED : September 6, 1983

INVENTOR(S) : Kuhlmann et al.

It is certified that error appears in the above–identified patent and that said Letters Patent are hereby corrected as shown below:

Column 5, line 8, delete "accordingly" and insert --according--.

Column 5, lines 11-12, delete "threreof" and insert --thereof--.

Signed and Sealed this

Thirtieth Day of October 1984

[SEAL]

Attest:

GERALD J. MOSSINGHOFF

Attesting Officer

Commissioner of Patents and Trademarks